United States Patent [19]
Lawton

[11] Patent Number: 5,236,228
[45] Date of Patent: Aug. 17, 1993

[54] WATER METER ADAPTOR

[75] Inventor: Robert A. Lawton, Lincoln, R.I.

[73] Assignee: Ghelton, Inc., Lincoln, R.I.

[21] Appl. No.: 863,201

[22] Filed: Apr. 3, 1992

[51] Int. Cl.⁵ ............................................. F16L 23/02
[52] U.S. Cl. ................................... 285/30; 285/177; 285/368; 285/412; 73/201
[58] Field of Search .............. 285/30, 177, 368, 412; 73/201, 272, 273

[56] References Cited

U.S. PATENT DOCUMENTS

| | | | |
|---|---|---|---|
| 982,463 | 1/1911 | Bennett | 285/177 X |
| 1,071,585 | 8/1913 | Rossell | 285/177 X |
| 1,834,968 | 12/1931 | Rector | 285/368 X |
| 1,851,860 | 3/1932 | McKee | 285/30 |
| 2,196,766 | 4/1940 | Hasche | 285/177 X |
| 2,937,890 | 5/1960 | Mahoney | 285/368 X |
| 4,465,308 | 8/1984 | Martini | 285/177 |
| 4,637,641 | 1/1987 | Kennedy, Jr. | 285/368 X |
| 4,648,631 | 3/1987 | Bryant | 285/177 |

FOREIGN PATENT DOCUMENTS

| | | | |
|---|---|---|---|
| 0207296 | 10/1956 | Australia | 285/177 |
| 2261367 | 6/1974 | Fed. Rep. of Germany | 285/177 |
| 0591040 | 8/1977 | Switzerland | 285/177 |

Primary Examiner—Eric K. Nicholson
Assistant Examiner—Heather Chun
Attorney, Agent, or Firm—Salter, Michaelson & Benson

[57] ABSTRACT

An annular disk-shaped pipe adaptor permits a small water meter to be connected to a large diameter water pipe. The adaptor has a first side which is adapted to attach to the large flange of the large diameter pipe. The opposing side of the adaptor includes a plurality of outwardly extending threaded studs which are adapted for extending through holes provided in the flange of the inlet pipe of the water meter. A tapered central aperture gradually reduces the flow of water as it passes from the large diameter pipe to the water meter.

1 Claim, 3 Drawing Sheets

WATER METER ADAPTOR

BACKGROUND OF THE INVENTION

The instant invention relates to pipe couplings and more particularly relates to an adaptor for connecting a small water meter to a large diameter water pipe.

In recent years there has been a tendency for old mill buildings, factories, etc. to be converted into condominiums, office space, retail store space, etc. Since these old mill buildings and factories used large amounts of water in their operation, the water pipes and the water meters associated therewith were relatively large. An example of these prior art pipe arrangements is illustrated in FIG. 1 wherein WP indicates the large water pipes and WM indicates a large water meter. However, with the conversion of these old buildings, as stated above, the water consumption is now much lower and it has been found that use of the original large water meters does not give accurate readings for the lower water flows that now take place whereby water charges may be unnecessarily excessive. It is therefore desirable to substitute a smaller water meter in place of the original large meter so as to obtain more accurate readings for lower flow usage.

Pipe couplings of a reduced nature, i.e. for coupling a larger pipe with a smaller pipe, have heretofore been known in the art. In this regard, the U.S. Pat. No. 4,648,631 to Bryant represents the closest prior art to the subject invention of which the applicant is aware. Bryant discloses a coupling for connecting the ends of two pipes of different diameters. The Bryant coupling comprises a body member having a radially extending wall, and sleeve portions which axially extend in opposite directions from the radial wall. The coupling disclosed by Bryant is complicated, difficult to install, and is not effective for connecting pipes which have connecting flanges at the ends thereof.

SUMMARY OF THE INVENTION

The instant invention provides an adaptor which permits a small water meter to be connected to a large diameter pipe. Briefly, the adaptor comprises an annular disk having a first side which is adapted to attach to the flange of the large diameter pipe, and a second opposing side which includes a plurality of outwardly extending threaded studs. A plurality of holes are provided around the outer peripheral edge of the disk, which holes align with holes provided in the flange of the large diameter pipe. Bolts are extended through the aligned holes and nuts threaded thereon to attach the adaptor to the large pipe. The threaded studs on the opposing side of the adaptor are adapted for extending through holes provided in the flange of the smaller diameter inlet pipe of the water meter. Nuts are threaded onto the ends of the studs to attach the water meter to the adaptor. A tapered central aperture gradually reduces the flow of water as it passes from the larger diameter pipe to the water meter.

Accordingly, it is an object of the instant invention to provide an adaptor which permits a small water meter to be connected to a large diameter pipe.

It is another object to provide an adaptor for connecting pipes of different diameters.

It is yet another object to provide an adaptor which is simple to manufacture, and easy to install.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
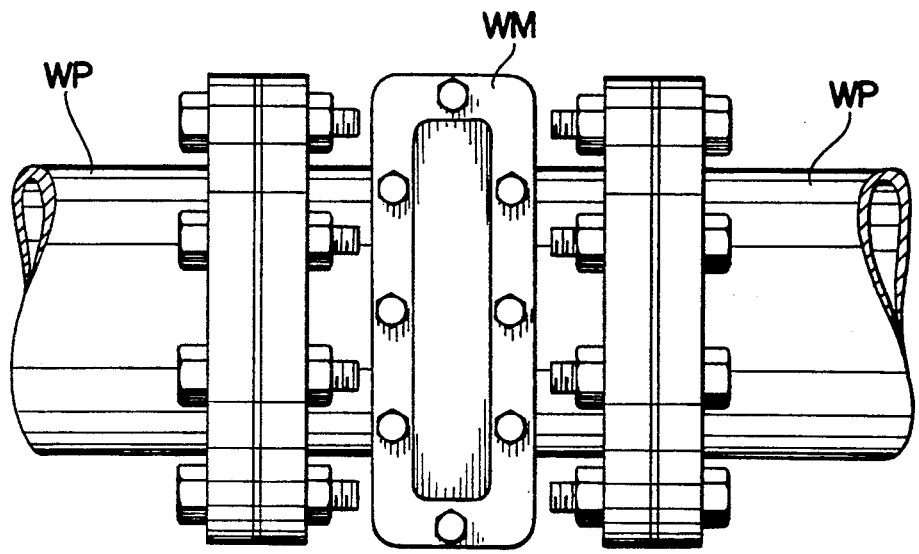
FIG. 1 is an elevational view of a large water meter connected between two large water pipes in accordance with the prior art.
Figure 2:
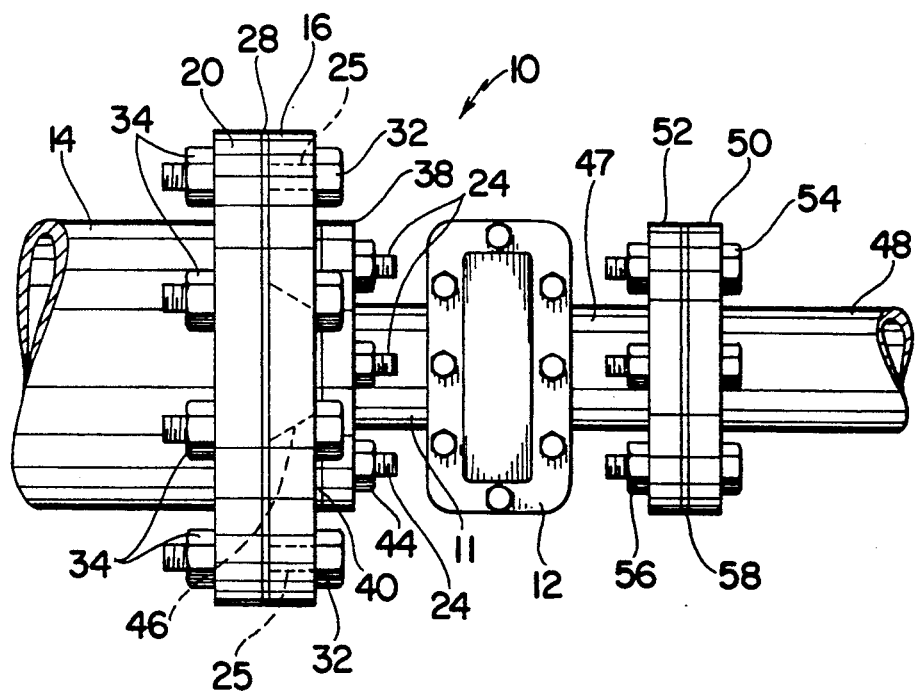
FIG. 2 is an elevational view of the adaptor of the instant invention with a small water meter connected to a large diameter pipe.
Figure 3:
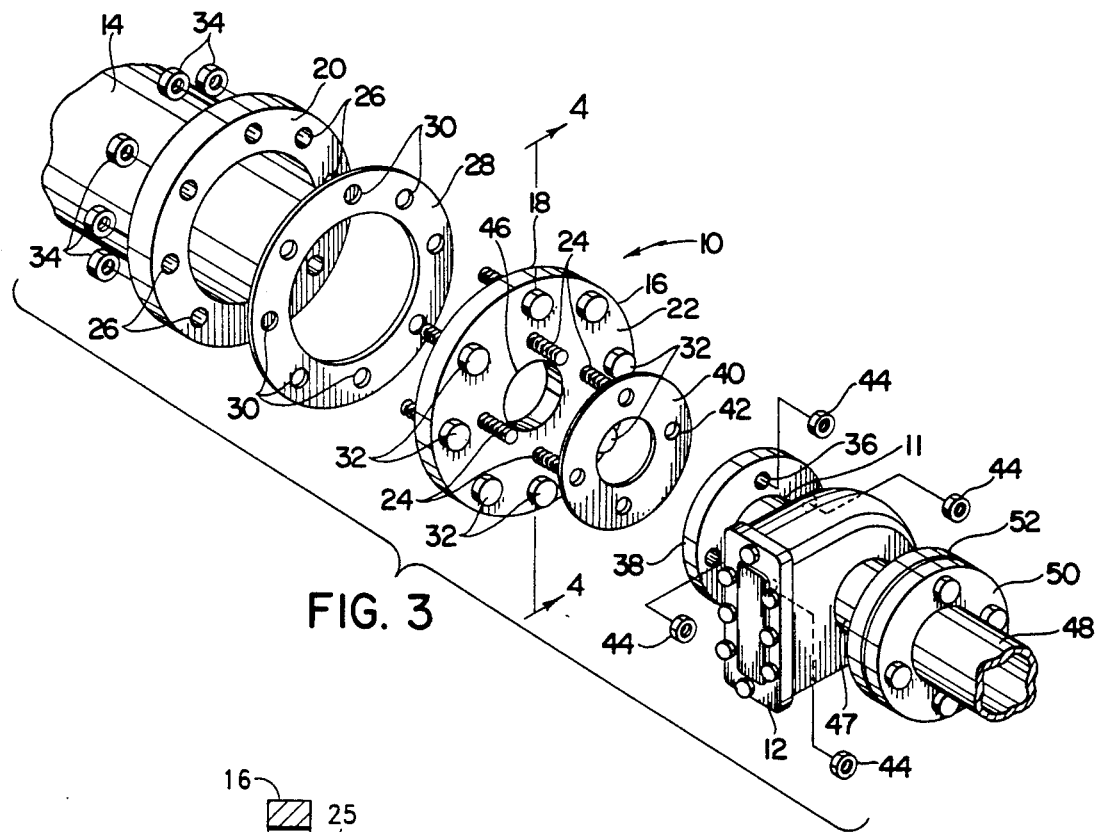
FIG. 3 is an exploded perspective view thereof.
Figure 4:
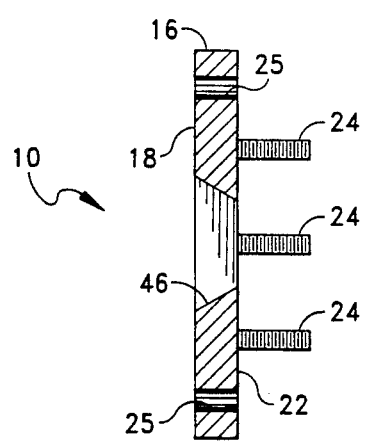
FIG. 4 is a cross-sectional view of the adaptor taken along line 4—4 in FIG. 3.

Referring now to the drawings, and particularly to FIGS. 2 and 3, the adaptor of the instant invention is illustrated and is generally indicated at 10. The adaptor 10 permits the inlet pipe of a small water meter 12 to be connected to a larger diameter water pipe 14 and it comprises an annular disk 16 having a first side 18 which is adapted to be attached to the flange 20 of the larger water pipe 14, and a second opposing side 22 having a plurality of threaded studs 24 extending outwardly therefrom. A plurality of holes 25 are provided around the outer peripheral edge of the disk 16, which holes align with holes 26 provided in the flange 20. A sealing gasket 28 having aligned holes 30 is interposed between the flange 20 and the first side 18 of the disk 16 to provide a watertight seal therebetween. A plurality of bolts 32 are extended through the aligned holes of the adaptor 10, the gasket 28, and the flange 20, and nuts 34 are threaded thereon to firmly attach the adapter 10 to the pipe 14. The threaded studs 24, which are located radially inward of bolts 32, are adapted for extending through holes 36 provided in the flange 38 of the inlet pipe 11 of the water meter 12. A second sealing gasket 40 with aligned holes 42 is disposed between the second side 22 of disk 16 and the flange 38 to provide a watertight seal therebetween. The threaded studs 24 pass through the aligned holes of the gasket 40 and the flange 38, and nuts 44 are threaded thereon to firmly attach the adaptor 10 to the water meter 12. The disk 16 further includes a central tapered aperture 46 (FIG. 4) having a larger diameter hole at the first side 18 and a smaller diameter hole at the second side 22. The tapered aperture 46 gradually reduces the flow of water as it passes from the large pipe 14 to the water meter 12. The outlet pipe 47 of the water meter 12 is attached to a smaller diameter water pipe 48 by means of flanges 50, 52 which are clasped to each other by bolts 54 and nuts 56, with sealing gasket 58 sandwiched between said flanges.

It is seen therefore that the instant invention provides an effective adaptor 10 for connecting a small water meter to a large diameter pipe. It is also seen that the instant invention provides an effective adaptor for connecting pipe of different diameters in other capacities not involving water meters. The adaptor easily and securely attaches to the flange of a larger diameter water pipe while a second opposing side easily and securely attaches to the flange of a smaller diameter inlet pipe of a small water meter to provide a direct link therebetween. The adaptor is small, easily manufactured, simple to install, and inexpensive, and further saves the expense of replacing the larger diameter water pipes of old buildings when they are renovated. For these reasons it is believed that the adaptor of the instant invention represents significant advancements in the art which had substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination,
    a water meter having a body portion and an inlet pipe extending from said body portion, said inlet pipe having a predetermined diameter, a circular connecting flange at a terminal end of the inlet pipe, and a plurality of circumferentially spaced holes extending through said flange, and
    an adaptor for connecting said water meter to a supply pipe having a larger diameter than said inlet pipe, a circular connecting flange at a terminal end of said supply pipe, and a plurality of circumferentially spaced holes extending through said flange,
    said adaptor comprising a circular disk having a diameter substantially equivalent to the diameter of said supply pipe flange, a plurality of circumferentially spaced holes therein which align with said holes in said supply pipe flanges, a plurality of circumferentially spaced threaded studs which extend axially from one side of said disk, said studs aligning with said holes in said inlet pipe flange and extending through said holes to secure said adaptor to said inlet pipe, and a tapered central aperture converging from said supply pipe diameter to said inlet pipe diameter,
    said adaptor including a plurality of threaded fasteners which extend through said holes in said adaptor and said supply pipe flange to secure said adaptor to said supply pipe.

* * * * *